US008349915B2

(12) United States Patent
Park et al.

(10) Patent No.: US 8,349,915 B2
(45) Date of Patent: *Jan. 8, 2013

(54) ENCAPSULATED COLORANT, METHOD OF PREPARING THE SAME, AND INK COMPOSITION INCLUDING THE ENCAPSULATED COLORANT

(75) Inventors: Heung-Sup Park, Suwon-si (KR); Jong-In Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 566 days.

This patent is subject to a terminal disclaimer.

(21) Appl. No.: 12/346,249

(22) Filed: Dec. 30, 2008

(65) Prior Publication Data

US 2009/0176927 A1 Jul. 9, 2009

(30) Foreign Application Priority Data

Jan. 3, 2008 (KR) ........................ 10-2008-0000790
Dec. 3, 2008 (KR) ........................ 10-2008-0122057

(51) Int. Cl.
*C09D 11/00* (2006.01)

(52) U.S. Cl. ........ 523/160; 347/100; 523/161; 523/200; 523/205; 523/208; 524/503; 524/515; 524/516; 524/523

(58) Field of Classification Search ............... 106/31.45, 106/31.58, 31.75, 31.86; 347/100; 523/160, 523/161, 200, 205, 208; 524/555, 556, 558, 524/560, 503, 515, 516, 523
See application file for complete search history.

(56) References Cited

U.S. PATENT DOCUMENTS

| | | | |
|---|---|---|---|
| 3,806,464 A | 4/1974 | Matrick et al. | |
| 3,876,603 A | 4/1975 | Makhlouf | |
| 4,036,652 A | 7/1977 | Rothmayer | |
| 4,694,302 A | 9/1987 | Hackleman et al. | |
| 5,172,133 A | 12/1992 | Suga et al. | |
| 5,272,201 A | 12/1993 | Ma et al. | |
| 5,529,616 A | 6/1996 | Prasad | |
| 5,623,294 A | 4/1997 | Takizawa et al. | |
| 5,629,359 A | 5/1997 | Peeters et al. | |
| 5,661,197 A * | 8/1997 | Villiger et al. | 523/161 |
| 5,889,083 A | 3/1999 | Zhu | |
| 6,455,220 B1 | 9/2002 | Cheng | |
| 6,498,203 B1 * | 12/2002 | Kito et al. | 523/161 |
| 6,864,302 B2 | 3/2005 | Miyabayashi | |
| 6,877,850 B2 | 4/2005 | Ishimoto et al. | |
| 6,916,862 B2 | 7/2005 | Ota et al. | |
| 6,946,023 B2 | 9/2005 | Mammen et al. | |
| 7,008,977 B2 | 3/2006 | Sakai et al. | |
| 7,074,843 B2 * | 7/2006 | Nakamura et al. | 523/205 |
| 7,119,133 B2 | 10/2006 | Vincent et al. | |
| 7,442,244 B2 | 10/2008 | Ishihara | |
| 7,521,085 B2 * | 4/2009 | Hall et al. | 427/213.34 |
| 2002/0193514 A1 | 12/2002 | Wang et al. | |
| 2003/0029355 A1 | 2/2003 | Miyabayashi | |
| 2003/0069329 A1 * | 4/2003 | Kubota et al. | 523/160 |
| 2003/0145761 A1 | 8/2003 | Redfearn et al. | |
| 2005/0004263 A1 | 1/2005 | Gould et al. | |
| 2005/0176847 A1 | 8/2005 | Cagle | |
| 2005/0276774 A1 | 12/2005 | Elder et al. | |
| 2007/0129462 A1 | 6/2007 | Ma | |
| 2007/0129463 A1 | 6/2007 | Ma | |
| 2007/0219291 A1 | 9/2007 | Doi et al. | |
| 2008/0026221 A1 | 1/2008 | Vincent et al. | |
| 2008/0269374 A1 | 10/2008 | Ganapathiappan | |
| 2009/0025601 A1 | 1/2009 | Vasudevan et al. | |

FOREIGN PATENT DOCUMENTS

| | | |
|---|---|---|
| JP | 07-048539 | 2/1995 |
| JP | 07-316489 | 12/1995 |
| JP | 11-005923 | 1/1999 |
| KR | 10-2002-0036767 | 5/2002 |

OTHER PUBLICATIONS

English language abstract of JP 07-316489, published Dec. 5, 1995.
Machine English language translation of JP 07-316489, published Dec. 5, 1995.
English language abstract of JP 07-048539, published Feb. 12, 1995.
Machine English language translation of JP 07-048539, published Feb. 12, 1995.
English language abstract of JP 11-005923, published Jan. 18, 1999.
Machine English language translation of JP 11-005923, published Jan. 18, 1999.
English language abstract of KR 10-2002-0036767, published May 16, 2002.
Office Action issued in U.S. Appl. No. 12/270,438, mailed Apr. 30, 2009.
Office Action issued in U.S. Appl. No. 12/270,438 mailed Nov. 20, 2009.
Office Action issued in U.S. Appl. No. 12/169,780 mailed May 1, 2009.
Office Action issued in U.S. Appl. No. 12/169,780 mailed Nov. 27, 2009.
Office Action issued in U.S. Appl. No. 12/177,908 mailed Apr. 29, 2009.
Office Action issued in U.S. Appl. No. 12/177,908 mailed Nov. 23, 2009.
Office Action issued in U.S. Appl. No. 12/198,323 mailed Apr. 29, 2009.
Office Action issued in U.S. Appl. No. 12/198,323 mailed Nov. 6, 2009.

* cited by examiner

*Primary Examiner* — David W Wu
*Assistant Examiner* — Marie Reddick
(74) *Attorney, Agent, or Firm* — Staas & Halsey LLP

(57) ABSTRACT

Provided are an encapsulated colorant, a method of preparing the same, and an ink composition including the encapsulated colorant.

4 Claims, 2 Drawing Sheets

ENCAPSULATED COLORANT, METHOD OF PREPARING THE SAME, AND INK COMPOSITION INCLUDING THE ENCAPSULATED COLORANT

CROSS-REFERENCE TO RELATED APPLICATIONS

This application claims priority under 35 U.S.C. §119(a) from Korean Patent Application Nos. 10-2008-0000790, filed on Jan. 3, 2008, and 10-2008-0122057, filed on Dec. 3, 2008 in the Korean Intellectual Property Office, the disclosures of which are incorporated herein in their entirety by reference.

BACKGROUND OF THE INVENTION

1. Field of the Invention

The present general inventive concept relates to an encapsulated colorant, a method of preparing the same, and an ink composition including the encapsulated colorant.

2. Description of the Related Art

In inkjet printers, a colorant is a material that selectively absorbs or reflects visible light and exhibits a unique color. Colorants are classified into dyes and pigments.

A dye refers to a colorant which is formed by using a given method to color a material such as fiber, leather, fur, and paper, and has high solar light fastness, washing fastness and abrasion fastness. A pigment refers to microparticles containing a colorant, which are not directly dyed on the surface of a material to be colored, but are attached to the surface of the material using a physical method, such as bonding, to provide a unique color.

Dyes mix with and are dissolved in solvents such as water. However, pigments, in general, are insoluble in solvents such as water and thus, evenly dispersing the pigment microparticles within a solution to permanently stabilize and maintain the dispersed pigment microparticles such that the pigment microparticles are not re-agglomerated is important.

Water-soluble dye-type ink has good long-term storage stability, maintains homogeneity, and has sharp color and brightness, but has poor waterfastness and lightfastness properties.

Pigment-type ink has a high optical density (OD), good fastness to water and light, and relatively low bleeding between colors, but has poor long-term storage stability compared to the dye-type ink. Moreover, a picture printed with pigment-type ink has poor rubbing fastness under dry and wet conditions; that is, resistance to abrasion is low.

In addition, while printing in color (multiple-color printing) with a dye or pigment, bleeding of boundaries between colors may occur, which reduces clarity of the picture.

Therefore, there is a need to develop an ink composition which has good storage stability with respect to water-soluble dye-type inks, along with good water fastness with respect to pigment-type inks, and with enhanced printed gloss and abrasion resistance.

Meanwhile, in order to improve the abrasion resistance of ink, a technique of adding a resin to ink compositions has been suggested. However, the addition of a resin may cause an increase in the ink viscosity, which is undesirable in inkjet printers. Also, a technique of adding resin particles to ink in order to suppress the viscosity increase of the ink has been suggested, but the abrasion resistance cannot be sufficiently improved because the resin particles and the pigment are dispersed separately in the ink.

Therefore, the problems mentioned above cannot be resolved by adding new additives to ink compositions. Thus, there is a need to improve ink composition properties by reforming the colorant.

SUMMARY OF THE INVENTION

The present general inventive concept provides: an encapsulated colorant for an ink composition that is used to print texts having waterfastness, lightfastness, abrasion resistance and good optical density, and images having durability and excellent printed gloss, wherein the encapsulated colorant is coated with a polymer resin having a controlled degree of swelling; a method of preparing the encapsulated colorant; an ink composition including the encapsulated colorant; an ink set including at least two kinds of the ink compositions; a cartridge for an inkjet recording apparatus, including the ink set; and an inkjet recording apparatus including the cartridge.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an encapsulated colorant including a colorant, and a polymer resin coating the colorant, wherein the polymer resin has a degree of swelling of 10 to 150%.

The foregoing and/or other aspects and utilities of the general inventive concept may also be achieved by providing a method of preparing the encapsulated colorant, the method including emulsifying a polymerization composition including polymerizable unsaturated monomers, an aqueous medium, a colorant, a crosslinking agent, an emulsifier, and a polymerization initiator, and polymerizing the polymerizable unsaturated monomers and the crosslinking agent in a presence of the colorant to form a polymer resin coating the colorant such that a degree of swelling of the polymer resin is in a range of 10 to 150%.

The foregoing and/or other aspects and utilities of the general inventive concept may also be achieved by providing an ink composition including the encapsulated colorant.

The foregoing and/or other aspects and utilities of the general inventive concept may also be achieved by providing an ink composition includes: a solvent; and an encapsulated colorant including a polymer resin having a cross-linked structure, wherein the encapsulated colorant has varying printing loss and an optical concentration according to a degree of swelling of the cross-linked polymer.

The foregoing and/or other aspects and utilities of the general inventive concept may also be achieved by providing an ink set including at least two types of the ink compositions.

The foregoing and/or other aspects and utilities of the general inventive concept may also be achieved by providing a cartridge for an inkjet recording apparatus, including the ink set.

BRIEF DESCRIPTION OF THE DRAWINGS

The above and other features and utilities of the present general inventive concept will become more apparent by describing in detail exemplary embodiments thereof with reference to the attached drawings in which.

DETAILED DESCRIPTION OF THE PREFERRED EMBODIMENTS

Figure 1:
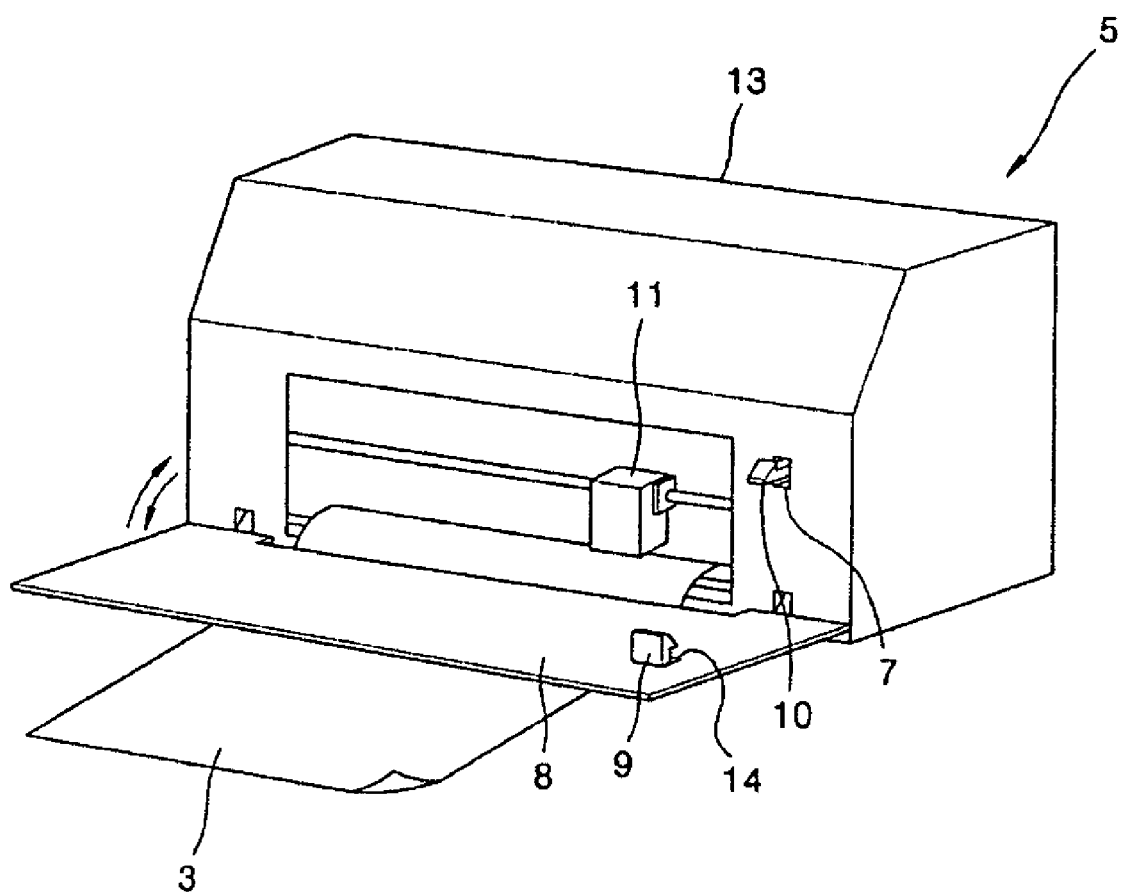
FIG. 1 is a perspective view illustrating an inkjet printing apparatus including an ink cartridge according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

An encapsulated colorant according to an embodiment of the present general inventive concept includes a colorant; and a polymer resin coating the colorant, wherein the polymer resin has a degree of swelling of about 10 to about 150%.

The colorant may be any dye or pigment that is used in the art. Examples of the colorant are direct dyes, acidic dyes, eatable dyes, alkaline dyes, reactive dyes, dispersant dyes, oil-based dyes, pigments, self-dispersing pigments, and a mixture thereof.

In particular, the dyes may include black food dyes, red food dyes, yellow food dyes, blue food dyes, black acid dyes, red acid dyes, blue acid dyes, yellow acid dyes, black direct dyes, blue direct dyes, yellow direct dyes, anthraquinone dyes, monoazo dyies, diazo dyes, and phthalocyanine derivatives. The pigments may include carbon black, graphite, vitreous carbon, activated charcoal, activated carbon, anthraquinone, phthalocyanine blue, phthalocyanine green, diazos, monoazos, pyranthrones, perylene, quinacridone, and indigoid pigments. The self-dispersing pigments may include cabojet-series and CW-series (Orient Chemical). However, the dyes, the pigments, and the self-dispersing pigments are not limited to these colorants.

The polymer resin may be prepared by polymerizing a composition including polymerizable unsaturated monomers, a crosslinking agent, and a polymerization initiator.

The polymerizable unsaturated monomers may include one or more monomer selected from the group consisting of unsaturated carboxylic acid, vinyl cyanide monomer, unsaturated carboxylic acid alkyl ester, unsaturated carboxylic acid hydroxyalkyl ester, unsaturated carboxylic acid amide and respective derivatives thereof, aromatic vinyl monomer, methyl vinyl ketone, and vinylidene chloride.

Specifically, the unsaturated carboxylic acid may include at least one of methacrylic acid, acrylic acid, itaconic acid, crotonic acid, fumaric acid, and maleic acid; the unsaturated carboxylic acid alkyl ester may be at least one of itaconic acid monoethyl ester, fumaric acid monobutyl ester, and maleic acid monobutyl ester; the vinyl cyanide monomer may be acrylonitrile or methacrylonitrile; the unsaturated carboxylic acid amide may be acrylamide, methacrylamide, itaconic amide, or maleic acid monoamide or respective derivatives thereof; and the aromatic vinyl monomer may include at least one of α-methylstyrene, vinyl toluene, and p-methylstyrene.

The crosslinking agent makes the polymer resin coating the colorant to have a cross-linked structure. Therefore, in an encapsulated colorant according to an embodiment of the present general inventive concept, the polymer resin can obtain a fine net structure. Therefore, an ink composition including the encapsulated colorant may have various values of printed gloss and print concentration according to a degree of swelling of the cross-linked polymer resin.

The crosslinking agent may be selected from the group consisting of aldehyde-based crosslinking agents, epoxy-based crosslinking agents, and carbodiimide-based crosslinking agents.

The aldehyde-based crosslinking agent may be aldehyde, a compound represented by Formula 1, or dextrin aldehyde. The compound represented by Formula 1 may be glutal aldehyde, glyoxal, succine aldehyde, or adipaldehyde, but is not limited thereto.

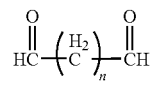

[Formula 1]

where n=1 to 10.

The epoxy-based crosslinking agent may be a compound represented by Formula 2:

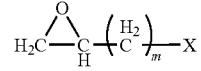

[Formula 2]

where m=1 to 10, X is a halogen or

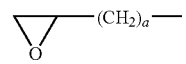

where a is an integer ranging from 1 to 30, and one or more methylene group may be substituted with an aromatic group or oxygen.

The epoxy-based crosslinking agent may be epichloro hydrine, ethylene glycol glycidyl ether, resorcinol glycidyl ether, neopentyl glycol glycidyl ether, 1,6-hexandiol glycidyl ether, hydrogenated bisphenol A glycidyl ether, polybutadiene glycidyl ether, diethylene glycol glycidyl ether, polyethylene glycol glycidyl ether, dipropylene glycol glycidyl ether, polypropylene glycol glycidyl ether, sorbitol polyglycidyl ether, polyglycerol polyglycidyl ether, pentaerythritol polyglycidyl ether, diglycerol polyglycidyl ether, glycerol polyglycidyl ether, or trimethylolpropane polyglycidyl ether, but is not limited thereto.

The carbodiimide-based crosslinking agent may be 1-ethyl-3(3-dimethylamino-propyl)carbodiimide, dicyclocarbodiimide, or 1-ethyl-3-(2-morpholinyl-4-methyl)-carbodiimide, but is not limited thereto.

The polymer resin has various degrees of swelling according to a type of the polymerizable monomer and a degree of crosslinkage. A colorant encapsulated by a polymer resin having a high degree of swelling has soft properties, and a colorant encapsulated by a polymer resin having a low degree of swelling has hard properties. Therefore, a degree of hardness of a shell of such a colorant may be appropriately adjusted to print text of high optical density or images of high printed gloss.

In an encapsulated colorant according to an embodiment of the present general inventive concept, a degree of swelling of the polymer resin may be in a range of about 10 to about 150%, such as in a range of about 60 to about 100%.

The degree of swelling of the polymer resin is represented as a percentage, that is, a percentage of an increase of a weight of the polymer resin between when the polymer resin is completely dry and when the polymer resin is saturated. When a degree of crosslinkage of the polymer resin is small, the polymer resin can be easily deformed when external moisture permeates the polymer resin and thus the polymer resin can contain even more moisture. Alternatively, when a degree of crosslinkage of the polymer resin is large, permeation by external moisture into the polymer resin due to a hard structure of the polymer resin is difficult. Therefore, the polymer resin will not swell and may contain a small amount of moisture. As described above, a degree of crosslinkage of the polymer resin can be measured using a degree of swelling.

A method of measuring a degree of swelling will now be described in detail.

The weight of an encapsulated colorant in which a colorant is encapsulated by a polymer resin is separated using a centrifuge, and then the weight of the separated encapsulated colorant is measured. Then, the encapsulated colorant is dried in an oven at 70° C. for 10 hours and the weight of the dried encapsulated colorant is measured. Then, a degree of swelling can be obtained using the following equation:

Degree of swelling (%)=[($WW-DW$)/$DW$]×100

WW: weight of the encapsulated colorant after being separated using a centrifuge (g)

DW: weight of the dry encapsulated colorant (g)

When the degree of swelling is less than about 10%, a degree of crosslinkage is too low and a linear polymer resin is formed. The linear polymer resin is not effective at encapsulating the colorant. Alternatively, when the degree of swelling is greater than about 150%, the shell of the encapsulated colorant, that is, the cross-linked polymer resin is too thick and the encapsulated colorant becomes difficult to obtain a predetermined color.

A method of preparing an encapsulated colorant includes emulsifying a polymerization composition including polymerizable unsaturated monomers, an aqueous medium, a colorant, a crosslinking agent, an emulsifier, and a polymerization initiator; and polymerizing the polymerizable unsaturated monomers and the crosslinking agent in the presence of the colorant to form a polymer resin coating the colorant, wherein the polymer resin has a degree of swelling in a range of about 10 to about 150%.

The polymerizable unsaturated monomers, as described above, may include at least one of unsaturated carboxylic acid, vinyl cyanide monomer, unsaturated carboxylic acid alkyl ester, unsaturated carboxylic acid hydroxyalkyl ester, unsaturated carboxylic acid amide and derivatives thereof, and an aromatic vinyl monomer.

The aqueous solvent may be water or a combined solvent of water and an organic solvent. An amount of the aqueous solvent may be in a range of about 500 to about 5,000 parts by weight, specifically, about 1,500 to about 3,000 parts by weight, based on 100 parts by weight of the polymerizable unsaturated monomers. When the amount of the aqueous solvent is less than about 500 parts by weight based on 100 parts by weight of the polymerizable unsaturated monomers, the reaction proceeds too rapidly, and thus the coating polymer resin becomes too thick. Alternatively, when the amount of the aqueous solvent is greater than about 5,000 parts by weight based on 100 parts by weight of the polymerizable unsaturated monomers, moving monomers to reaction sites is difficult, the reaction is performed too slowly, and thus the polymer resin coating is degraded.

The colorant, as described above, may include direct dyes, acidic dyes, eatable dyes, alkaline dyes, reactive dyes, dispersant dyes, oil-based dyes, pigments, self-dispersing pigments, and a combination thereof.

The amount of the colorant may be in a range of about 0.1 to about 20 parts by weight, specifically about 1 to about 5 parts by weight, based on 100 parts by weight of the polymerizable unsaturated monomers. When the amount of the colorant is less than about 0.1 parts by weight, the optical density may be degraded. Alternatively, when the amount of the colorant is greater than about 20 parts by weight, stability of the colorant may be degraded.

The crosslinking agent, as described above, may be selected from the group consisting of aldehyde-based crosslinking agents, epoxy-based crosslinking agents, and carbodiimide-based crosslinking agents.

The amount of the crosslinking agent may be in a range of about 1 to about 20 parts by weight, specifically in a range of about 1 to about 10 parts by weight, based on 100 parts by weight of the polymerizable unsaturated monomers. When the amount of the crosslinking agent is less than about 1 part by weight, a degree of crosslinkage is too low and the obtained polymer resin may not sufficiently bind to the colorant. Alternatively, when the amount of the crosslinking agent is greater than about 20 parts by weight, a degree of crosslinkage is too high and the obtained encapsulated colorant may not be fused to a print medium.

The emulsifier may be a non-ionic emulsifier, an anionic emulsifier, or an ampholytic emulsifier containing protons.

The amount of the emulsifier may be in a range of about 0.01 to about 10 parts by weight, specifically in a range of about 0.1 to about 7 parts by weight, based on 100 parts by weight of the polymerizable unsaturated monomers. When the amount of the emulsifier is less than about 0.01 parts by weight based on 100 parts by weight of the polymerizable unsaturated monomers, the emulsifier is lower than a critical emulsifying concentration and therefore is not efficient. Alternatively, when the amount of the emulsifier is greater than about 10 parts by weight based on 100 parts by weight of the polymerizable unsaturated monomers, too much emulsifier is used and many bubbles are formed even after the reaction is finished.

As examples of a method of emulsification, one of a direct emulsification method, a natural emulsification method, and a phase-transition emulsification may be employed. In the direct emulsification method, in the presence of the polymerizable unsaturated monomers, the dispersed product of the colorant is emulsified in an emulsifier-containing aqueous medium using a dispersing tool such as a homomixer, a line mixer or a high pressure homogenizer. In the natural emulsification method, in the presence of the polymerizable unsaturated monomers, an emulsifier is added to the dispersed product of the colorant and then the obtained mixture is poured into a large amount of water.

In the phase-transition emulsification, in the presence of the polymerizable unsaturated monomers, an emulsifier is added to the dispersed product of the colorant and then water is added in small amounts while stirring the mixture.

The polymerization initiator may include water-soluble or fat-soluble persulfates, azo compounds, or peroxides and a reducing agent such as a redox composition composed of a mixture of hyposulfates. Specifically, the polymerization initiator may be ammonium persulfate, potassium persulfate, sodium persulfate, hydrogen peroxide, t-butyl hydroperoxide, t-butyl peroxybenzoate, 2,2-azobis-isobutyronitrile, 2,2-azobis(2-diaminopropane)hydrochloride, or 2,2-azobis(2,4-dimethylvaleronitrile).

The amount of the polymerization initiator may be in a range of about 0.05 to about 3 parts by weight, specifically in a range of about 0.5 to about 1.5 parts by weight, based on 100 parts by weight of the polymerizable unsaturated monomers.

When an amount of the polymerization initiator is less than about 0.05 parts by weight based on 100 parts by weight of the polymerizable unsaturated monomers, the reaction is not easily initiated and thus is slow. Alternatively, when the amount of the polymerization initiator is greater than about 3 parts by weight based on 100 parts by weight of the polymerizable unsaturated monomers, the reaction becomes too fast to control.

The polymerization initiator may be added early in the reaction along with the other materials participating in the polymerization reaction, that is, the polymerizable unsaturated monomers, the aqueous solvent, the colorant, the crosslinking agent, the chain transferring agent, and the emulsifier. Alternatively, the polymerization initiator may be added after emulsifying the other materials, followed by heating the resultant. In the former method, the rate of reaction is difficult to control, and in the latter method, the rate of reaction is easy to control.

In some cases, the polymerization composition may further include other additives, such as UV absorber, antioxidants, and color enhancers.

In the method of preparing an encapsulated colorant according to an embodiment of the present general inventive concept, a degree of crosslinkage of the polymer resin is changed by adjusting the amount of the crosslinking agent, and thus a degree of swelling of the cross-linked polymer resin can be controlled. That is, according to the present general inventive concept, an encapsulated colorant in which colorants are encapsulated by polymer resins having various degrees of swelling can be prepared.

When the amount of the crosslinking agent is in a range of about 4.2 to about 20 parts by weight based on 100 parts by weight of the polymerizable unsaturated monomer, a degree of swelling of the polymer resin may be in a range of about 10 to about 70%. Alternatively, when the amount of the crosslinking agent is in a range of about 1 to about 4 parts by weight, a degree of swelling of the polymer resin may be in a range of about 90 to about 150%.

An ink composition according to the present general inventive concept includes the encapsulated colorant and a solvent.

In the ink composition according to the present general inventive concept, an amount of the encapsulated colorant may be in a range of about 1 to about 20 parts by a weight, such a range of about 2 to about 10 parts by weight, including in a range of about 3 to about 7 parts by weight, based on 100 parts by weight of the ink composition.

When the amount of the encapsulated colorant is less than about 1 part by weight based on 100 parts by weight of the ink composition, implementing a desired optical density is difficult. Alternatively, when the amount of the encapsulated colorant is greater than about 20 parts by weight, the viscosity of the ink composition is too high, and thus ink discharge performance may be degraded.

The solvent may be an aqueous-based solvent such as water, and the solvent may further include one or more types of an organic solvent. The amount of the solvent may be in a range of about 80 to about 99 parts by weight, such as in a range of about 85 to about 98 parts by weight, including, about 90 to about 97 parts by weight, based on 100 parts by weight of the ink composition.

When the amount of the solvent is less than about 80 parts by weight based on 100 parts by weight of the ink composition, the viscosity of the ink composition becomes too high, and thus ink discharge performance may be degraded. Alternatively, when the amount of the solvent is greater than about 99 parts by weight based on 100 parts by weight of the ink composition, the ink discharge performance may be degraded due to an increase in the surface tension of the ink composition.

The organic solvent may be at least one selected from the group consisting of a monohydric alcohol-based solvent, a polyhydric alcohol-based solvent, a ketone-based solvent, an ester-based solvent, a nitrogen-containing solvent, and a sulfur-containing solvent.

The monohydric alcohol-based solvent may be methyl alcohol, ethyl alcohol, n-propyl alcohol, isopropyl alcohol, n-butyl alcohol, sec-butyl alcohol, t-butyl alcohol, or isobutyl alcohol. The polyhydric alcohol-based solvent may be ethylene glycol, diethylene glycol, triethylene glycol, propylene glycol, butylene glycol, 1,4-butanediol, 1,2,4-butanetriol, 1,5-pentanediol, 1,2,6-hexanetriol, hexylene glycol, glycerol, glycerol ethoxylate, or trimethyl propane ethoxylate. The ketone-based solvent may be acetone, methylethyl ketone, diethyl ketone or diacetone alcohol. The ester-based solvent may be methyl acetate, ethyl acetate, or ethyl lactate. The monohydric alcohol-based solvent that acts as the organic solvent controls the surface tension of the ink, improving permeability on print media such as normal paper or specialized paper, dot-forming ability, and drying properties of a printed image. Polyhydric alcohols and derivatives thereof do not evaporate easily, lowering the setting point of the ink and improving the storage stability of the ink, thereby acting to prevent clogging of nozzles.

The nitrogen-containing solvent may be 2-pyrrolidone or N-methyl-2-pyrrolidone; and the sulfur-containing solvent may be dimethyl sulfoxide, tetramethyl sulfone, or thioglycol.

When the organic solvent is used together with the aqueous solvent, an amount of the organic solvent may be in a range of about 0.1 to about 130 parts by weight, specifically in a range of about 10 to about 50 parts by weight, based on 100 parts by weight of water. When the amount of the organic solvent is less than about 0.1 parts by weight based on 100 parts by weight of water, the surface tension of the ink is too high. Alternatively, when the amount of the organic solvent is greater than about 130 parts by weight based on 100 parts by weight of water, the viscosity of the ink increases, thereby degrading the ejection performance.

The ink composition according to an embodiment of the present general inventive concept may include various additives in order to strengthen properties of the ink composition. Specifically, the ink composition may include at least one additive selected from the group consisting of a moisturizer, a dispersant, a surfactant, a viscosity controlling agent, a pH controlling agent, and an antioxidant. An amount of the additives may be in a range of about 0.5 to about 600 parts by weight, specifically, about 10 to about 300 parts by weight, based on 100 parts by weight of the colorant. If the amount of the additive is less than about 0.5 parts by weight based on 100 parts by weight of the colorant, the additive has too little effect, and if the amount of the additive is greater than about 600 parts by weight based on 100 parts by weight of the colorant, the storage stability of the ink composition deteriorates.

Specifically, the surfactant may be unlimited, and can be appropriately determined according to the purpose thereof. For example, the surfactant may be an amphoteric surfactant, an anionic surfactant, a cationic surfactant, or a nonionic surfactant. These surfactants can also be used in combination.

The amphoteric surfactant may be, for example, dodecyldi(aminoethyl)glycine, di(octylaminoethyl)glycine, or N-alkyl-N,N-dimethylammoniumbetaine.

The anionic surfactant may be, for example, alkylbenzensulfonate salt, α-olefinsulfonate salt, polyoxyethylene alkylether acetate salt, or a phosphate ester.

The cationic surfactant may be, for example, amine salt type surfactants such as alkyl amine salt, aminoalcohol fatty acid derivatives, polyamine fatty acid derivatives, and imidazoline; and quaternary ammonium salt type surfactants such as alkyltrimethyl ammonium salt, dialkyldimethyl ammonium salt, alkyldimethylbenzyl ammonium salt, pyridinium salt, alkylisoquinolinium salt, and benzethonium chloride.

The non-ionic surfactant may be, for example, polyoxyethylene alkylether surfactant, polyoxyethylene alkyl phenyl ether surfactant, and acetylene glycol surfactant.

Among the above-described surfactants, the non-ionic surfactants have superior packaging abilities.

Specifically, examples of the non-ionic surfactant are SURFYNOL having acetylenic ethoxylated diol produced by Air Products Co., TERGITOL having polyethylene oxide or polypropylene oxide produced by Union Carbide Co., and Tween having polyoxyethylene sorbitan fatty acid ester.

The ink composition according to an embodiment of the present general inventive concept may have a surface tension of about 15 to about 70 dyne/cm, specifically about 20 to about 50 dyne/cm, at 25° C., and the viscosity of about 1 to about 15 cps, specifically about 1.5 to about 10 cps, at 25° C. When the surface tension of the ink composition is outside of the above range, printing performance may be degraded. When the viscosity of the ink composition is outside the above range, the ejection performance may be degraded.

An ink set according to an embodiment of the present general inventive concept includes two or more different types of the ink composition described above.

When the ink set includes two types of ink compositions, one type of ink composition may include an encapsulated colorant having a polymer resin with a degree of swelling of about 10 to about 70%, and the other type of ink composition may include an encapsulated colorant having a polymer resin with a degree of swelling of about 90 to about 150%.

Also, when the ink set includes two types of ink compositions, a difference between a degree of swelling of a polymer resin of an encapsulated colorant included in one type of ink composition and a degree of swelling of a polymer resin of an encapsulated colorant included in the other type of ink composition may be in a range of about 20 to about 140, such as in a range of about 20 to about 100%, including in a range of about 30 to about 80%. When the difference is less than about 20%, differentiating the pigment inks from each other may not be possible. Alternatively, when the difference is greater than about 140%, one pigment ink may not undergo the crosslinking reaction and thus the encapsulation effect may not occur.

In the ink set including two types of ink compositions in which a degree of swelling of a polymer resin of an encapsulated colorant included in one type of ink composition is different from a degree of swelling of a polymer resin of an encapsulated colorant included in the other type of ink composition, the ink composition including an encapsulated colorant having a polymer resin with a higher degree of swelling, that is, a higher degree of crosslinkage is used to print text; alternatively when the other ink composition including an encapsulated colorant having a polymer resin with a lower degree of swelling, that is, a lower degree of crosslinkage is used to print images.

In this regard, the encapsulated colorant having a polymer resin with a lower degree of swelling is hard and thus does not spread on a print media and the thickness of the printed ink may be maintained even after the printing. Therefore, such an encapsulated colorant is suitable for text, which has high optical density. Alternatively, the encapsulated colorant having a polymer resin with a higher degree of swelling may easily spread on a print media and the ink may uniformly spread after the printing. Therefore, the latter encapsulated colorant is suitable for images having excellent durability and excellent printed gloss. Thus, the ink set according to the present general inventive concept may be used to print high-quality text and images.

Such an ink set may be used in an ink receptor unit of an inkjet printing apparatus or an inkjet printer cartridge. An inkjet printing apparatus according to an embodiment of the present general inventive concept may include a thermal head, to discharge ink fluid by vapour pressure from heating the ink composition, a piezo head, to discharge ink fluid using a piezo device, a disposable head, or a permanent head. Moreover, the inkjet printing apparatus may be a scanning type printer or an array type printer, and may be used for desktops, textiles, and industrial purposes. Head types, printer types and uses thereof related to the inkjet printing apparatus according to an embodiment of the present general inventive concept are listed only to illustrate the inkjet printing apparatus according to the present embodiment in more detail, and clearly, the inkjet printing apparatus in which the ink composition can be used is not limited to the previously described inkjet printing apparatus.

FIG. 1 is a perspective view illustrating an inkjet printing apparatus 5 including an inkjet printer cartridge 11, according to an embodiment of the present general inventive concept. Referring to FIG. 1, the inkjet printing apparatus 5 includes an inkjet printer cartridge 11 including an ink composition according to an embodiment of the present general inventive concept. A printer cover 8 is connected to a main body 13 of the inkjet printing apparatus 5. An interlocked area on a movable latch 10 protrudes through a hole 7 in the main body 13. A fixed latch 9 is disposed on an inside surface of the printer cover 8 to correspond to the movable latch 10. The fixed latch 9 is interlocked with the movable latch 10, when the printer cover 8 is closed. The printer cover 8 includes a recess 14 corresponding to an interlocking area of the movable latch 10 extending through the hole 7. The inkjet printer cartridge 11 is installed to position ink on a paper 3 passing under the inkjet printer cartridge 11.

Figure 2:
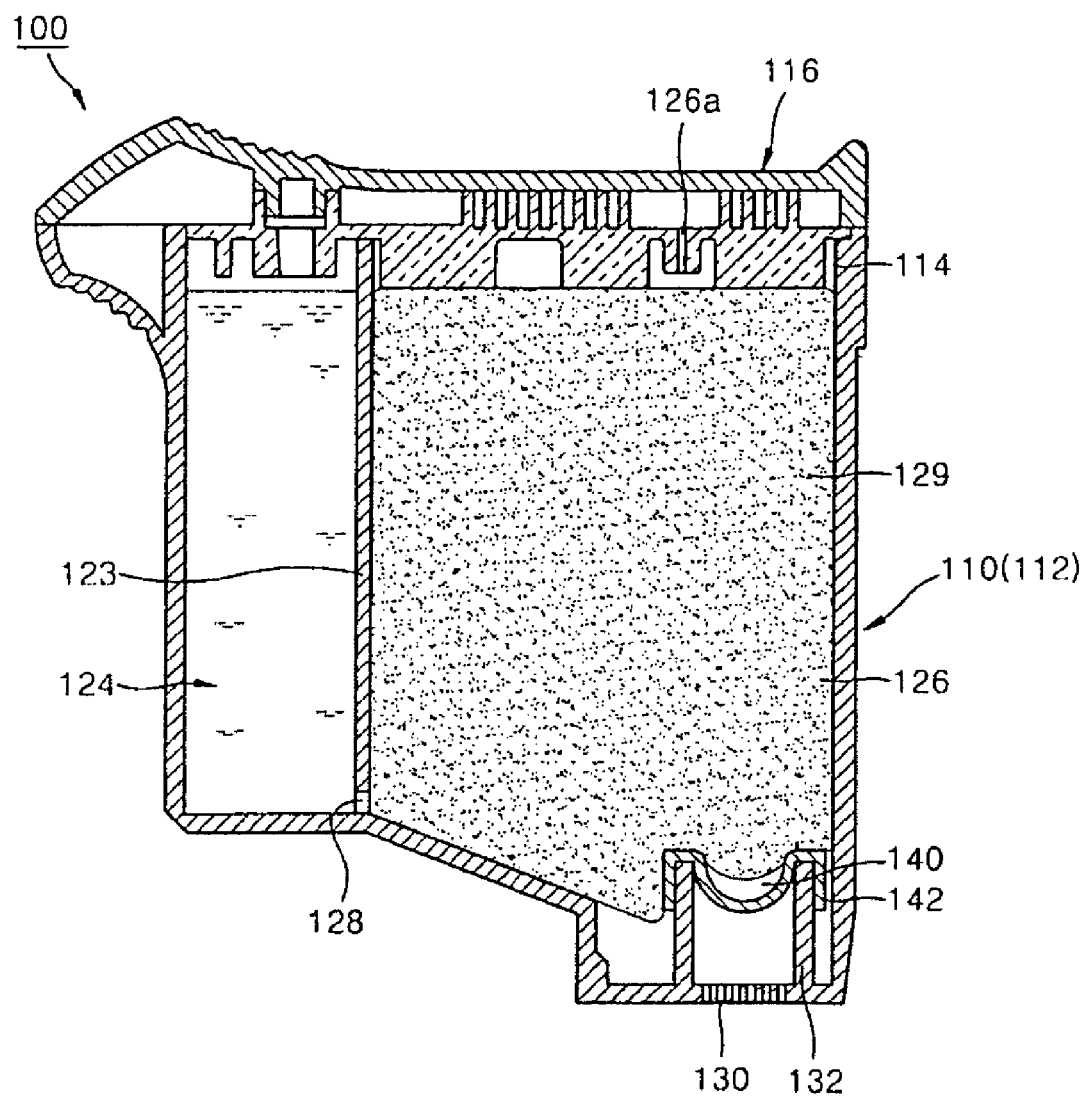
FIG. 2 is a cross-sectional view of an ink cartridge according to an embodiment of the present general inventive concept.

FIG. 2 is a cross-sectional view illustrating an inkjet printer cartridge 100 including an ink set according to an embodiment of the present general inventive concept. Referring to FIG. 2, the inkjet printer cartridge 100 includes a cartridge body 110 to form an ink storage chamber 112, an inner cover 114 to cover a top area of the ink storage chamber 112, and an outer cover 116 which is separated from the inner cover 114 by a predetermined distance and seals the ink storage chamber 112 and the inner cover 114.

The ink storage chamber 112 is divided into a first chamber 124 and a second chamber 126 by a vertical barrier wall 123. An ink passage 128 is formed on a bottom of the vertical barrier wall 123 between the first chamber 124 and the second chamber 126. The ink fills the first chamber 124 and a sponge 129 disposed in the second chamber 126. A vent hole 126a corresponding to the second chamber 126 is formed in the inner cover 114.

A filter 140 is formed at a lower portion of the second chamber 126 and filters impurities and microbubbles to prevent clogging of an ejection hole. A hook 142 is formed on the edge of the filter 140 and is coupled to the top portion of a standpipe 132. The ink in the ink storage chamber 112 passes through the ejection hole of the printer head 130, and is ejected in a form of small drops to the print media.

The present general inventive concept will be described in further detail with reference to the following examples. These examples are for illustrative purposes only and are not intended to limit the scope of the present general inventive concept.

Example 1-1-1

1,360 g of distilled water, 384.8 g of carbon black (Cabot Co., cabojet-300), 7 g of sodium hydroxide, 9 g of disodium-didodecyidiphenyloxide disulfonate (DPOS 45, Cytec Co., U.S.), 20 g of vinyl alcohol monomer, 120 g of styrene monomer, and 3.2 g of t-dodecylmercaptan were added to a high temperature-high pressure reactor (5 L) including a stirrer and then stirred at 250 rpm to perform a nitrogen substitution reaction. Then, 2 g of glutalaldehyde was added to the reactor and nitrogen was added thereto until the reactor pressure was increased to 2 kg/cm. The mixture was stirred for 30 minutes to sufficiently mix all the added materials. Then, the temperature of the reactor was increased to 70° C. and the materials in the reactor were stirred for 300 minutes to produce an encapsulated colorant. The degree of swelling of a polymer resin of the encapsulated colorant was 140%.

Example 1-1-2

An encapsulated colorant was prepared in the same manner as in Example 1-1-1, except that 5 g of glutalaldehyde was used. The degree of swelling of a polymer resin of the encapsulated colorant was 98%.

Example 1-1-3

An encapsulated colorant was prepared in the same manner as in Example 1-1-1, except that 10 g of glutalaldehyde was used. The degree of swelling of a polymer resin of the encapsulated colorant was 74%.

Example 1-2-1

An encapsulated colorant was prepared in the same manner as in Example 1-1-1, except that, as a polymerizable monomer, 200 g of (meth)acrylester monomer was used instead of 20 g of vinyl alcohol monomer and 120 g of styrene monomer, and, as a crosslinking agent, 2 g of epichlorohydrine was used instead of 2 g of glutalaldehyde. The degree of swelling of a polymer resin of the encapsulated colorant was 145%.

Example 1-2-2

An encapsulated colorant was prepared in the same manner as in Example 1-1-1, except that, as a polymerizable monomer, 200 g of (meth)acrylester monomer was used instead of 20 g of vinyl alcohol monomer and 120 g of styrene monomer, and, as a crosslinking agent, 5 g of epichlorohydrine was used instead of 2 g of glutalaldehyde. The degree of swelling of a polymer resin of the encapsulated colorant was 96%.

Example 1-2-3

An encapsulated colorant was prepared in the same manner as in Example 1-1-1, except that, as a polymerizable monomer, 200 g of N-dimethylmaleimide monomer was used instead of 20 g of vinyl alcohol monomer and 120 g of styrene monomer, and, as a crosslinking agent, 2 g of 1-ethyl-3(3-dimethylaminopropyl)carbodiimide was used instead of 2 g of glutal aldehyde. The degree of swelling of a polymer resin of the encapsulated colorant was 132%.

Example 1-3-1

An encapsulated colorant was prepared in the same manner as in Example 1-1-1, except that, as a polymerizable monomer, 200 g of N-dimethylmaleimide monomer was used instead of 20 g of vinyl alcohol monomer and 120 g of styrene monomer, and, as a crosslinking agent, 5 g of 1-ethyl-3(3-dimethylaminopropyl)carbodiimide was used instead of 2 g of glutal aldehyde. The degree of swelling of a polymer resin of the encapsulated colorant was 63%.

Example 1-3-2

An encapsulated colorant was prepared in the same manner as in Example 1-1-1, except that, as a polymerizable monomer, 200 g of N-dimethylmaleimide monomer was used instead of 20 g of vinyl alcohol monomer and 120 g of styrene monomer, and, as a crosslinking agent, 10 g of 1-ethyl-3(3-dimethylaminopropyl)carbodiimide was used instead of 2 g of glutal aldehyde. The degree of swelling of a polymer resin of the encapsulated colorant was 36%.

Example 1-3-3

An encapsulated colorant was prepared in the same manner as in Example 1-1-1, except that, as a polymerizable monomer, 200 g of N-dimethylmaleimide monomer was used instead of 20 g of vinyl alcohol monomer and 120 g of styrene monomer, and, as a crosslinking agent, 10 g of 1-ethyl-3-(3-dimethylaminopropylcarboimide) was used instead of 2 g of glutalaldehyde. The degree of swelling of a polymer resin of the encapsulated colorant was 36%.

<Preparation of Encapsulated Colorant having a Polymer Resin that is not Cross-Linked>

Comparative Example 1-1-1

An encapsulated colorant was prepared in the same manner as in Example 1-1-1, except that 2 g of glutalaldehyde was not used. The degree of swelling of a polymer resin of the encapsulated colorant was 168%.

Comparative Example 1-1-2

An encapsulated colorant was prepared in the same manner as in Example 1-1-1, except that 1 g of glutalaldehyde was used. The degree of swelling of a polymer resin of the encapsulated colorant was 153%

Comparative Example 1-1-3

An encapsulated colorant was prepared in the same manner as in Example 1-1-1, except that 30 g of glutalaldehyde was used. The degree of swelling of a polymer resin of the encapsulated colorant was 9.2%.

Comparative Example 1-2-1

An encapsulated colorant was prepared in the same manner as in Example 1-2-1, except that 2 g of epichlorohydrine was not used. The degree of swelling of a polymer resin of the encapsulated colorant was 157%.

Comparative Example 1-2-2

An encapsulated colorant was prepared in the same manner as in Example 1-2-1, except that 1 g of epichlorohydrine was used. The degree of swelling of a polymer resin of the encapsulated colorant was 151%.

Comparative Example 1-2-3

An encapsulated colorant was prepared in the same manner as in Example 1-2-1, except that 35 g of epichlorohydrine was used. The degree of swelling of a polymer resin of the encapsulated colorant was 8.5%.

Comparative Example 1-3-1

An encapsulated colorant was prepared in the same manner as in Example 1-3-1, except that 2 g of 1-ethyl-3(3-dimethylaminopropyl)carbodiimide was not used. The degree of swelling of a polymer resin of the encapsulated colorant was 13%.

Comparative Example 1-3-2

An encapsulated colorant was prepared in the same manner as in Example 1-3-1, except that 1 g of 1-ethyl-3(3-dimethylaminopropyl)carbodiimide was used. The degree of swelling of a polymer resin of the encapsulated colorant was 158%.

Comparative Example 1-3-3

An encapsulated colorant was prepared in the same manner as in Example 1-3-1, except that 5 g of 1-ethyl-3(3-dimethylaminopropyl)carbodiimide was used. The degree of swelling of a polymer resin of the encapsulated colorant was 8.3%.

<Preparation of Ink Composition>

Each of the encapsulated colorants prepared according to Examples 1-1-1 to 1-3-3 and Comparative Examples 1-1-1 to 1-3-3, water, an organic solvent, and additives were mixed in the compositions described below and the obtained mixture was sufficiently stirred using a mixer for 30 minutes or more to produce a homogeneous solution. Then, the mixture was filtered using a 0.45 μm filter to prepare ink compositions of Examples 2-1-1 through 2-3-3 and Comparative Examples 2-1-1 through 2-3-3.

The same experiment was performed using a conventional colorant instead of an encapsulated colorant to prepare ink compositions of Comparative Examples 3 through 5.

Example 2-1-1

| | |
|---|---|
| Encapsulated colorant prepared according to Example 1-1-1 | 4.5 parts by weight |
| Glycerol | 7.5 parts by weight |
| Diethyleneglycol | 8 parts by weight |
| Water (deionized water) | 72 parts by weight |
| Glycerol propoxylate | 4 parts by weight |
| 1,3-dimethyl-3,4,5,6-tetrahydro-pyrimidinone | 4 parts by weight |

Example 2-1-2

| | |
|---|---|
| Encapsulated colorant prepared according to Example 1-1-2 | 4.5 parts by weight |
| Glycerol | 7.5 parts by weight |
| Diethyleneglycol | 8 parts by weight |
| Water (deionized water) | 72 parts by weight |
| Glycerol propoxylate | 4 parts by weight |
| 1,3-dimethyl-3,4,5,6-tetrahydro-pyrimidinone | 4 parts by weight |

Example 2-1-3

| | |
|---|---|
| Encapsulated colorant prepared according to Example 1-1-3 | 4.5 parts by weight |
| Glycerol | 7.5 parts by weight |
| Diethyleneglycol | 8 parts by weight |
| Water (deionized water) | 72 parts by weight |
| Glycerol propoxylate | 4 parts by weight |
| 1,3-dimethyl-3,4,5,6-tetrahydro-pyrimidinone | 4 parts by weight |

Example 2-2-1

| | |
|---|---|
| Encapsulated colorant prepared according to Example 1-2-1 | 4.5 parts by weight |
| Glycerol | 7.5 parts by weight |
| Diethyleneglycol | 8 parts by weight |
| Water (deionized water) | 72 parts by weight |
| Glycerol propoxylate | 4 parts by weight |
| 1,3-dimethyl-3,4,5,6-tetrahydro-pyrimidinone | 4 parts by weight |

Example 2-2-2

| | |
|---|---|
| Encapsulated colorant prepared according to Example 1-2-2 | 4.5 parts by weight |
| Glycerol | 7.5 parts by weight |
| Diethyleneglycol | 8 parts by weight |
| Water (deionized water) | 72 parts by weight |
| Glycerol propoxylate | 4 parts by weight |
| 1,3-dimethyl-3,4,5,6-tetrahydro-pyrimidinone | 4 parts by weight |

Example 2-2-3

| | |
|---|---|
| Encapsulated colorant prepared according to Example 1-2-3 | 4.5 parts by weight |
| Glycerol | 7.5 parts by weight |
| Diethyleneglycol | 8 parts by weight |
| Water (deionized water) | 72 parts by weight |
| Glycerol propoxylate | 4 parts by weight |
| 1,3-dimethyl-3,4,5,6-tetrahydro-pyrimidinone | 4 parts by weight |

Example 2-3-1

| | |
|---|---|
| Encapsulated colorant prepared according to Example 1-3-1 | 4.5 parts by weight |
| Glycerol | 7.5 parts by weight |
| Diethyleneglycol | 8 parts by weight |
| Water (deionized water) | 72 parts by weight |
| Glycerol propoxylate | 4 parts by weight |
| 1,3-dimethyl-2-imidazolidinone | 4 parts by weight |

Example 2-3-2

| | |
|---|---|
| Encapsulated colorant prepared according to Example 1-3-2 | 4.5 parts by weight |
| Glycerol | 7.5 parts by weight |
| Diethyleneglycol | 8 parts by weight |
| Water (deionized water) | 72 parts by weight |
| Glycerol propoxylate | 4 parts by weight |
| 1,3-dimethyl-2-imidazolidinone | 4 parts by weight |

Example 2-3-3

| | |
|---|---|
| Encapsulated colorant prepared according to Example 1-3-3 | 4.5 parts by weight |
| Glycerol | 7.5 parts by weight |
| Diethyleneglycol | 8 parts by weight |
| Water (deionized water) | 72 parts by weight |
| Glycerol propoxylate | 4 parts by weight |
| 1,3-dimethyl-2-imidazolidinone | 4 parts by weight |

Comparative Example 2-1-1

| | |
|---|---|
| Encapsulated colorant prepared according to Comparative Example 1-1-1 | 4.5 parts by weight |
| Glycerol | 7.5 parts by weight |
| Diethyleneglycol | 8 parts by weight |
| Water (deionized water) | 72 parts by weight |
| Glycerol propoxylate | 4 parts by weight |
| 1,3-dimethyl-3,4,5,6-tetrahydro-pyrimidinone | 4 parts by weight |

Comparative Example 2-1-2

| | |
|---|---|
| Encapsulated colorant prepared according to Comparative Example 1-1-2 | 4.5 parts by weight |
| Glycerol | 7.5 parts by weight |
| Diethyleneglycol | 8 parts by weight |
| Water (deionized water) | 72 parts by weight |
| Glycerol propoxylate | 4 parts by weight |
| 1,3-dimethyl-3,4,5,6-tetrahydro-pyrimidinone | 4 parts by weight |

Comparative Example 2-1-3

| | |
|---|---|
| Encapsulated colorant prepared according to Comparative Example 1-1-3 | 4.5 parts by weight |
| Glycerol | 7.5 parts by weight |
| Diethyleneglycol | 8 parts by weight |
| Water (deionized water) | 72 parts by weight |
| Glycerol propoxylate | 4 parts by weight |
| 1,3-dimethyl-3,4,5,6-tetrahydro-pyrimidinone | 4 parts by weight |

Comparative Example 2-2-1

| | |
|---|---|
| Encapsulated colorant prepared according to Comparative Example 1-2-1 | 4.5 parts by weight |
| Glycerol | 7.5 parts by weight |
| Diethyleneglycol | 8 parts by weight |
| Water (deionized water) | 72 parts by weight |
| Trimethylolpropane propoxylate | 4 parts by weight |
| 1,3-dimethyl-3,4,5,6-tetrahydro-pyrimidinone | 4 parts by weight |

Comparative Example 2-2-2

| | |
|---|---|
| Encapsulated colorant prepared according to Comparative Example 1-2-2 | 4.5 parts by weight |
| Glycerol | 7.5 parts by weight |
| Diethyleneglycol | 8 parts by weight |
| Water (deionized water) | 72 parts by weight |
| Trimethylolpropane propoxylate | 4 parts by weight |
| 1,3-dimethyl-3,4,5,6-tetrahydro-pyrimidinone | 4 parts by weight |

Comparative Example 2-2-3

| | |
|---|---|
| Encapsulated colorant prepared according to Comparative Example 1-2-3 | 4.5 parts by weight |
| Glycerol | 7.5 parts by weight |
| Diethyleneglycol | 8 parts by weight |
| Water (deionized water) | 72 parts by weight |
| Trimethylolpropane propoxylate | 4 parts by weight |
| 1,3-dimethyl-3,4,5,6-tetrahydro-pyrimidinone | 4 parts by weight |

Comparative Example 2-3-1

| | |
|---|---|
| Encapsulated colorant prepared according to Comparative Example 1-3-1 | 4.5 parts by weight |
| Glycerol | 7.5 parts by weight |
| Diethyleneglycol | 8 parts by weight |
| Water (deionized water) | 72 parts by weight |
| Pentaeritritol propoxylate | 4 parts by weight |
| 1,3-dimethyl-2-imidazolinone | 4 parts by weight |

Comparative Example 2-3-2

| | |
|---|---|
| Encapsulated colorant prepared according to Comparative Example 1-3-2 | 4.5 parts by weight |
| Glycerol | 7.5 parts by weight |
| Diethyleneglycol | 8 parts by weight |
| Water (deionized water) | 72 parts by weight |
| Pentaeritritol propoxylate | 4 parts by weight |
| 1,3-dimethyl-2-imidazolinone | 4 parts by weight |

Comparative Example 2-3-3

| | |
|---|---|
| Encapsulated colorant prepared according to Comparative Example 1-3-3 | 4.5 parts by weight |
| Glycerol | 7.5 parts by weight |
| Diethyleneglycol | 8 parts by weight |
| Water (deionized water) | 72 parts by weight |
| Pentaeritritol propoxylate | 4 parts by weight |
| 1,3-dimethyl-2-imidazolinone | 4 parts by weight |

Comparative Example 3

| | |
|---|---|
| Raven 5250 (produced by Columbian Co.) | 4.5 parts by weight |
| Glycerol | 7.5 parts by weight |
| Diethyleneglycol | 8.0 parts by weight |
| Water (deionized water) | 80.0 parts by weight |

Comparative Example 4

| | |
|---|---|
| Regal 330 (produced by Cabot Co.) | 4.0 parts by weight |
| Glycerol | 7.5 parts by weight |
| Diethyleneglycol | 8.0 parts by weight |
| Water (deionized water) | 80.0 parts by weight |

Comparative Example 5

| | |
|---|---|
| NB (produced by Clariant) | 4.5 parts by weight |
| Glycerol | 7.5 parts by weight |
| Diethyleneglycol | 8.0 parts by weight |
| Water (deionized water) | 80.0 parts by weight |

Experimental Example 1

Optical Density (OD) Test

An ink cartridge M-50 (manufactured by Samsung Co.) was filled with the ink compositions prepared according to Examples 2-1-1 through 2-3-3, Comparative Examples 2-1-1 through 2-3-3, and Comparative Examples 3 through 5 and then a bar image (2×10 cm) was printed using a printer (MJC-3300p, manufactured by Samsung) and dried for 24 hours. Then, the OD of the bar image was measured using an OD tester (GretagMacdeth, produced by SpectorEye Co.). The results are illustrated in Table 1.

$A$=OD of the bar image

⊚: $A \geq 1.4$
O: $1.2 \leq A < 1.4$
Δ: $1.0 \leq A < 1.2$
X: $A < 1.0$

Experimental Example 2

Abrasion Resistance Test

An ink cartridge M-50 (manufactured by Samsung Co.) was filled with the ink compositions prepared according to Examples 2-1-1 through 2-3-3, Comparative Examples 2-1-1 through 2-3-3, and Comparative Examples 3 through 5 and then a bar image (2×10 cm) was printed using a printer (MJC-3300p, manufactured by Samsung) and dried for 24 hours. Then, the printed bar image was rubbed five times. The ratio of the OD of the transitioned image to the OD of the original image was expressed in percentages and evaluated below as illustrated in Table 1.

$A$=(OD of transitioned image/OD of original bar)×100 (%)

⊚: $A < 15$
O: $15 \leq A < 30$
Δ: $30 \leq A \leq 45$
X: $A > 45$

Experimental Example 3

Waterfastness Test

An ink cartridge M-50 (manufactured by Samsung Co.) was filled with the ink compositions prepared according to Examples 2-1-1 through 2-3-3, Comparative Examples 2-1-1 through 2-3-3, and Comparative Examples 3 through 5, and then a bar image (2×10 cm) was printed using a printer (MJC-2400, manufactured by Samsung) and left to sit for 5 minute. Then, 5 drops of water were dropped on the image and dried for 24 hours. The OD of the water-run bar image was reduced. The ratio of the OD of the water-run bar image to the OD of the original bar image was expressed in percentages. The results are illustrated in Table 1.

$A$=(OD of the water-run image/OD of original bar image)×100(%)

⊚: $95 \leq A$
O: $90 \leq A < 95$,
Δ: $85 \leq A < 90$
X: $A < 85$

Experimental Example 4

Printed Gloss Test

An ink cartridge M-50 (manufactured by Samsung Co.) was filled with the ink compositions prepared according to Examples 2-1-1 through 2-3-3, Comparative Examples 2-1-1 through 2-3-3, and Comparative Examples 3 through 5, and then a bar image (2×10 cm) was printed using a printer (MJC-2400, manufactured by Samsung) and left to sit for 120 minutes. Then, the printed gloss was measured using a glossmeter and evaluated as follows. The results are illustrated in Table 1.

⊚: $40 \leq A$
O: $35 \leq A < 40$
Δ: $30 \leq A < 35$
X: $A < 30$

TABLE 1

| | Encapsulated | Cross-linked | Degree of swelling (%) | Optical density | Abrasion resistance | Waterfastness | Printed gloss |
|---|---|---|---|---|---|---|---|
| Example 2-1-1 | ○ | ○ | 140 | ◎ | ○ | ○ | ◎ |
| Example 2-1-2 | ○ | ○ | 98 | ◎ | ◎ | ◎ | ○ |
| Example 2-1-3 | ○ | ○ | 74 | ◎ | ◎ | ◎ | ○ |
| Example 2-2-1 | ○ | ○ | 145 | ○ | △ | ○ | ◎ |
| Example 2-2-2 | ○ | ○ | 96 | ○ | ◎ | ◎ | ○ |
| Example 2-2-3 | ○ | ○ | 76 | ○ | ◎ | ◎ | ○ |
| Example 2-3-1 | ○ | ○ | 132 | ○ | ○ | ○ | ◎ |
| Example 2-3-2 | ○ | ○ | 63 | ○ | ◎ | ◎ | ◎ |
| Example 2-3-3 | ○ | ○ | 36 | ○ | ◎ | ◎ | ○ |
| Comparative Example 2-1-1 | ○ | X | 168 | △ | X | ○ | ◎ |
| Comparative Example 2-1-2 | ○ | ○ | 153 | △ | X | ○ | ◎ |
| Comparative Example 2-1-3 | ○ | ○ | 9.2 | △ | X | ○ | △ |
| Comparative Example 2-2-1 | ○ | X | 157 | △ | △ | ○ | ◎ |
| Comparative Example 2-2-2 | ○ | ○ | 151 | △ | △ | ○ | ◎ |
| Comparative Example 2-2-3 | ○ | ○ | 8.5 | △ | △ | ○ | △ |
| Comparative Example 2-3-1 | ○ | X | 173 | X | X | △ | ◎ |
| Comparative Example 2-3-2 | ○ | ○ | 158 | X | △ | △ | ○ |
| Comparative Example 2-3-3 | ○ | ○ | 8.3 | △ | △ | △ | △ |
| Comparative Example 3 | X | X | 0 | △ | X | ○ | △ |
| Comparative Example 4 | X | X | 0 | △ | △ | ○ | △ |
| Comparative Example 5 | X | X | 0 | X | X | X | X |

Referring to Table 1, the ink composition including the encapsulated colorant having a crosslinked polymer resin, prepared according to each of Examples 2-1-1 to 2-3-3, illustrated better properties of abrasion resistance, waterfastness, printed gloss, and optical density than the ink compositions according to each of Comparative Examples 2-1-1 to 2-3-3, and 3-5. Specifically, when the ink compositions prepared according to Examples 2-1-1 through 2-3-3 in which an encapsulated colorant has an appropriate degree range of swelling due to the cross-linked structure are used, excellent optical concentration properties can be obtained because the change in thickness after printing is small. However, when the ink compositions prepared according to Comparative Examples 2-1-1 through 2-3-3 and Comparative Examples 3 through 5 are used, the level of swelling is too high and thus the change in thickness after printing is substantially too high, or the cross-linked structure is too dense and thus the encapsulated colorants become too small and absorbed into paper during printing and the optical concentration is reduced.

According to above embodiments of the present general inventive concept, in an encapsulated colorant in which a colorant is encapsulated by a polymer resin, a degree of swelling of the polymer resin can be controlled. Therefore, an ink composition including an encapsulated colorant having a polymer resin with a lower degree of swelling can be used to print texts and an ink composition including an encapsulated colorant having a polymer resin with a higher degree of swelling can be used to print images. Therefore, texts having properties of excellent waterfastness, lightfastness, abrasion resistance, and optical density and images having excellent printed gloss can be obtained at the same time.

While the present general inventive concept has been particularly illustrated and described with reference to exemplary embodiments thereof, it will be understood by those of ordinary skill in the art that various changes in form and details may be made therein without departing from the spirit and scope of the present general inventive concept as defined by the following claims.

What is claimed is:

1. An ink set for inkjet printing comprising:
   a) at least one first ink composition comprising:
   a colorant;
   a cross-linked polymer resin encapsulating the colorant;
      wherein the polymer resin is prepared by polymerizing a composition comprising a polymerizable unsaturated monomer, a crosslinking agent, and a polymerization initiator, wherein the polymerizable unsaturated monomer is vinyl alcohol, styrene, (meth)acrylate, N-dimethylmaleimide, or a mixture thereof, wherein the crosslinking agent is glutal aldehyde, epichlorohydrin or 1-ethyl-3-(3-dimethylaminopropylcarbodiimide); and
   a solvent; and
   b) at least one second ink composition comprising:
   a colorant;
   a cross-linked polymer resin encapsulating the colorant;
      wherein the polymer resin is prepared by polymerizing a composition comprising a polymerizable unsaturated monomer, a crosslinking agent, and a polymerization initiator, wherein the polymerizable unsaturated monomer is vinyl alcohol, styrene, (meth)acrylate, N-dimethylmaleimide, or a mixture thereof, wherein the crosslinking agent is glutal aldehyde, epichlorohydrin or 1-ethyl-3-(3-dimethylaminopropylcarbodiimide); and
   a solvent,
   wherein the polymer resin in the first ink composition has a degree of swelling of about 10% to about 70%; and wherein the polymer resin in the second ink composition has a degree of swelling of about 90% to about 150%.

2. A cartridge for an inkjet printing apparatus comprising the ink set of claim 1.

3. An inkjet printing apparatus comprising the cartridge for the inkjet print apparatus of claim 2.

4. The ink set of claim 1, wherein the first ink composition is prepared using the cross-linking agent in the range of about 4.2 to about 0 parts by weight based on 10 parts by weight of the polymerizable unsaturated monomer; and wherein the second ink composition is prepared using the cross-linking agent in the range of about 1 to about 4 parts by weight based on 100 parts by weight of the polymerizable unsaturated monomer.

* * * * *

UNITED STATES PATENT AND TRADEMARK OFFICE
CERTIFICATE OF CORRECTION

| | | |
|---|---|---|
| PATENT NO. | : 8,349,915 B2 | Page 1 of 1 |
| APPLICATION NO. | : 12/346249 | |
| DATED | : January 8, 2013 | |
| INVENTOR(S) | : Heung-sup Park et al. | |

It is certified that error appears in the above-identified patent and that said Letters Patent is hereby corrected as shown below:

In the Claims

Column 21, line 6, in Claim 3, delete "print" and insert -- printing --, therefor.
Column 22, line 1, in Claim 4, delete "0 parts" and insert -- 20 parts --, therefor.
Column 22, line 1, in Claim 4, delete "10 parts" and insert -- 100 parts --, therefor.

Signed and Sealed this
Fifteenth Day of September, 2015

Michelle K. Lee
*Director of the United States Patent and Trademark Office*